United States Patent
DeFelice et al.

(10) Patent No.: US 10,603,891 B2
(45) Date of Patent: Mar. 31, 2020

(54) ADDITIVELY MANUFACTURED HIGH TEMPERATURE OBJECTS

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 42 days.

(21) Appl. No.: 15/499,425

(22) Filed: Apr. 27, 2017

(65) Prior Publication Data

US 2017/0313050 A1    Nov. 2, 2017

Related U.S. Application Data

(60) Provisional application No. 62/329,480, filed on Apr. 29, 2016.

(51) Int. Cl.
*B33Y 10/00* (2015.01)
*B33Y 70/00* (2020.01)
(Continued)

(52) U.S. Cl.
CPC ............. *B33Y 10/00* (2014.12); *B28B 11/24* (2013.01); *B29C 64/153* (2017.08);
(Continued)

(58) Field of Classification Search
CPC ......... B33Y 10/00; B33Y 80/00; B33Y 70/00; C23C 18/34; C23C 18/36; C23C 18/1653;
(Continued)

(56) References Cited

U.S. PATENT DOCUMENTS 6,530,946 B1 * 3/2003 Noda .................. A61F 7/12
                                                  606/27
8,227,029 B2 * 7/2012 Birnstock ............ C23C 14/12
                                                  118/726
(Continued)

FOREIGN PATENT DOCUMENTS

| JP | 2015213167 A | 11/2015 |
|---|---|---|
| WO | 2015006414 A1 | 1/2015 |
| WO | 2015124903 A1 | 8/2015 |

OTHER PUBLICATIONS

Denault, J. et al.: "Consolidation Process of PEEK.Carbon Composite for Aerospace Applications" Advanced Performance Materials, Kluwer, Dordrecht, Germany, vol. 5. No. 1 Published: Jan. 1, 1998, 14 pages.
(Continued)

*Primary Examiner* — Rick K Chang
(74) *Attorney, Agent, or Firm* — Whitmyer IP Group LLC

(57) ABSTRACT

Method for producing an object by additively manufacturing a preform of the object from a building material comprising a polymer. The preform is encapsulated with a metal or metal alloy encapsulant that is capable of withstanding temperatures greater than the preform. The encapsulated preform is heated at a predetermined temperature and for a period of time, such that the preform at least partially transmutes into the form of a carbonaceous solid.

10 Claims, 5 Drawing Sheets

(51) Int. Cl.
*B33Y 80/00* (2015.01)
*C04B 35/524* (2006.01)
*C04B 35/83* (2006.01)
*B29C 64/153* (2017.01)
*C04B 35/634* (2006.01)
*C25D 5/50* (2006.01)
*C23C 18/36* (2006.01)
*C25D 5/12* (2006.01)
*C23C 18/34* (2006.01)
*C23C 18/16* (2006.01)
*B28B 11/24* (2006.01)
*C23C 18/32* (2006.01)
*B29K 71/00* (2006.01)
*B29K 105/06* (2006.01)
*B29K 307/04* (2006.01)

(52) U.S. Cl.
CPC ...... *C04B 35/524* (2013.01); *C04B 35/63488* (2013.01); *C04B 35/83* (2013.01); *C23C 18/1653* (2013.01); *C23C 18/1692* (2013.01); *C23C 18/32* (2013.01); *C23C 18/34* (2013.01); *C23C 18/36* (2013.01); *C25D 5/12* (2013.01); *C25D 5/50* (2013.01); *B29K 2071/00* (2013.01); *B29K 2105/06* (2013.01); *B29K 2307/04* (2013.01); *B33Y 70/00* (2014.12); *B33Y 80/00* (2014.12); *C04B 2235/48* (2013.01); *C04B 2235/6026* (2013.01); *C04B 2235/658* (2013.01); *C04B 2235/6562* (2013.01); *C04B 2235/665* (2013.01)

(58) Field of Classification Search
CPC ....... C23C 18/1692; C23C 18/32; C25D 5/50; C25D 5/12; B29C 64/153; B28B 1/001; B28B 11/24; C04B 2235/665; C04B 2235/658; C04B 2235/6562; C04B 2235/6026; C04B 2235/48; C04B 35/83; C04B 35/63488; C04B 35/524; B29K 2071/00; B29K 2105/06; B29K 2307/04
See application file for complete search history.

(56) References Cited

U.S. PATENT DOCUMENTS

| | | | | |
|---|---|---|---|---|
| 9,226,827 | B2 * | 1/2016 | Luscher | A61B 17/68 |
| 9,785,064 | B2 * | 10/2017 | Orrock | G03G 9/0819 |
| 10,011,089 | B2 * | 7/2018 | Lyons | B32B 5/16 |
| 10,207,489 | B2 * | 2/2019 | Dave | G01N 21/00 |
| 10,232,602 | B2 * | 3/2019 | Bessac | B22F 3/24 |
| 2003/0054131 | A1 | 3/2003 | Ooshima et al. | |
| 2015/0061195 | A1 | 3/2015 | DeFelice et al. | |

OTHER PUBLICATIONS

Extended European Search Report Application No. 17168785.8 completed Date: Sep. 15, 2017; dated Oct. 6, 2017 11 Pages.
Japanese Office Action Application No. 2017-089821 Completed Date: Jun. 4, 2018 5 Pages.
Translation of Japanese Office Action Application No. 2017-089821 Completed Date: Jun. 4, 2018; dated Jun. 12, 2018 3 Pages.

* cited by examiner

ADDITIVELY MANUFACTURED HIGH TEMPERATURE OBJECTS

TECHNICAL FIELD

The present disclosure generally relates to preforms and methods for manufacturing objects using such preforms, and more particularly relates to high temperature objects manufactured from high temperature preforms and methods for manufacturing objects using such preforms.

BACKGROUND

The use of additive manufacturing techniques is helping to increase efficiency in the aerospace industry. Parts manufactured by such techniques typically weigh less, reducing fuel consumption during operation. Moreover such techniques typically allow for the manufacture of complex geometries with shorter lead times. One such additive manufacturing technique is selective laser sintering ("LS"). LS is a layer-wise additive manufacturing technique in which electromagnetic radiation, for example from a $CO_2$ laser, is used to bind a powder building material at select points to create a solid structure having a desired three-dimensional shape. It is known to use a polymer based building material powder in LS. For example, a building material that may be used with the present invention is a carbon filled PEKK compound with superior mechanical properties that is sold under the brand name OXPEKK®-ESD by Oxford Performance Materials, Inc.

A disadvantage of parts manufactured by the LS process, and particularly polymer parts, is that there is an upper limit on the temperature at which such parts can reliably operate and function. If the part is operated above this temperature, the polymer structure will degrade. Such high operating temperatures are routinely experienced in the flight structure of hypersonic vehicles wherein the structure inside the vehicle typically is subject to temperatures between 400 C and 600 C during operation of the flight. It is not possible to reliably use parts printed from polymers using the LS technique in this application because the polymer matrix will degrade. Instead, it is known to use high temperature alloys. These materials are notoriously difficult to work with and are expensive. A new approach to forming lightweight, temperature tolerant structures is required.

Aspects of the present invention are directed to these and other problems.

SUMMARY

The present invention resides in one aspect in a method of producing a three-dimensional object. The method includes the steps of first additively manufacturing a preform of an object from a building material comprising a polymer. Next, the method includes the step of encapsulating the preform with a metal or metal alloy encapsulant that is capable of withstanding temperatures greater than the preform. Next, the method includes the step of heating the preform at a predetermined temperature and for a predetermined period of time, such that the preform at least partially transmutes into the form of a carbonaceous solid residue.

In some embodiments of the present invention, the encapsulating step is performed after the heating step. In other embodiments of the present invention, the encapsulating step is performed before the heating step.

In some embodiments of the present invention, method includes the step of maintaining the preform within an inert gas environment during the heating.

In some embodiments of the present invention, the step of additively manufacturing the preform of the object from the building material comprises the following steps: (i) applying a layer of the building material on a bed or on a previously applied layer of the building material in a powder form; (ii) solidifying select points of the layer of the building material by a heat energy introduced by electromagnetic radiation or particle radiation according to a cross-section pattern assigned to layer so that the building material at the select points is solidified by the radiation; (iii) successively repeating the steps of applying and solidifying until all cross sections of the preform of the object are solidified.

In some embodiments of the present invention, the building material comprises polyaryletherketone ("PAEK").

In some embodiments of the present invention, the building material comprises carbon fiber. In yet other embodiments of the present invention the carbon fiber the building material is at least 15% carbon fiber by weight.

In some embodiments of the present invention, the building material comprises polyetherketone ketone ("PEKK").

In some embodiments of the present invention, the step of encapsulating the preform is nickel plating.

In some embodiments of the present invention, the method includes the step of providing venting holes in the metal alloy encapsulant prior to the step of heating so that solvents may be offed from the preform during the step of heating.

In yet further embodiments of the present method, the step of heating comprises: increasing the temperature in the inert heating environment at a controlled rate that minimizes expansion of the preform and maintaining a temperature setpoint in the inert heating environment between 400 Celsius and 500 Celsius such that the preform at least partially transmutes into the form of a carbonaceous solid residue.

In yet some embodiments of the present invention, the temperature is maintained for a period of time such that the preform substantially transmutes into the form of a carbonaceous solid residue.

In yet further embodiments of the present invention, the method includes the step of closing the venting holes in the metal alloy encapsulant after the step of heating. In yet further embodiments of the present invention, this step is performed in an inert environment.

The present invention resides in yet another aspect in an object comprising a preform additively manufactured from a building material comprising a polymer, the preform having been heated at a predetermined temperature and for a predetermined period of time such that the preform at least partially transmuted into the form of a carbonaceous solid residue. The object further comprises a metal or metal allow encapsulant at least partially encapsulating the preform, the metal alloy encapsulant.

In yet some embodiments of the present invention, the building material comprises polyaryletherketone ("PAEK"). In yet further embodiments, the building material comprises carbon fiber. In yet some embodiments of the present invention, the building material is at least 15% carbon fiber by weight.

In some embodiments of the present invention, the building material comprises polyetherketoneketone ("PEKK").

In some embodiments of the present invention, the encapsulant comprises a nickel allowing applied by nickel plating.

In yet further embodiments of the present invention, the object is capable of withstanding sustained operating temperatures up to at least 500 Celsius for an extended period of operation.

DETAILED DESCRIPTION

Figure 1:
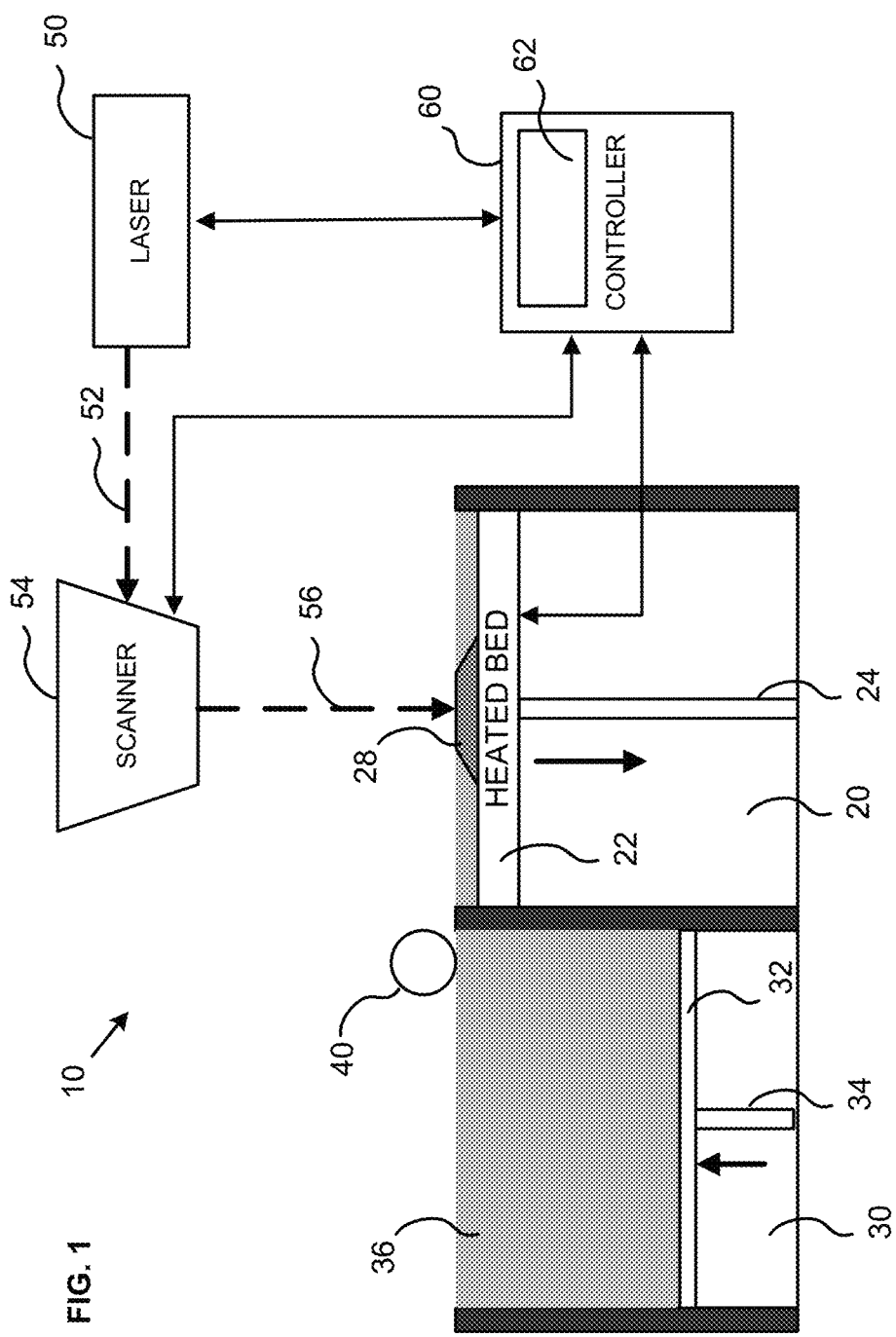
FIG. 1 illustrates an LS machine in accordance with one embodiment of the present invention.

The present disclosure describes aspects of the present invention with reference to the exemplary embodiments illustrated in the drawings; however, aspects of the present invention are not limited to the exemplary embodiments illustrated in the drawings. It will be apparent to those of ordinary skill in the art that aspects of the present invention include many more embodiments. Accordingly, aspects of the present invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

Figure 2:
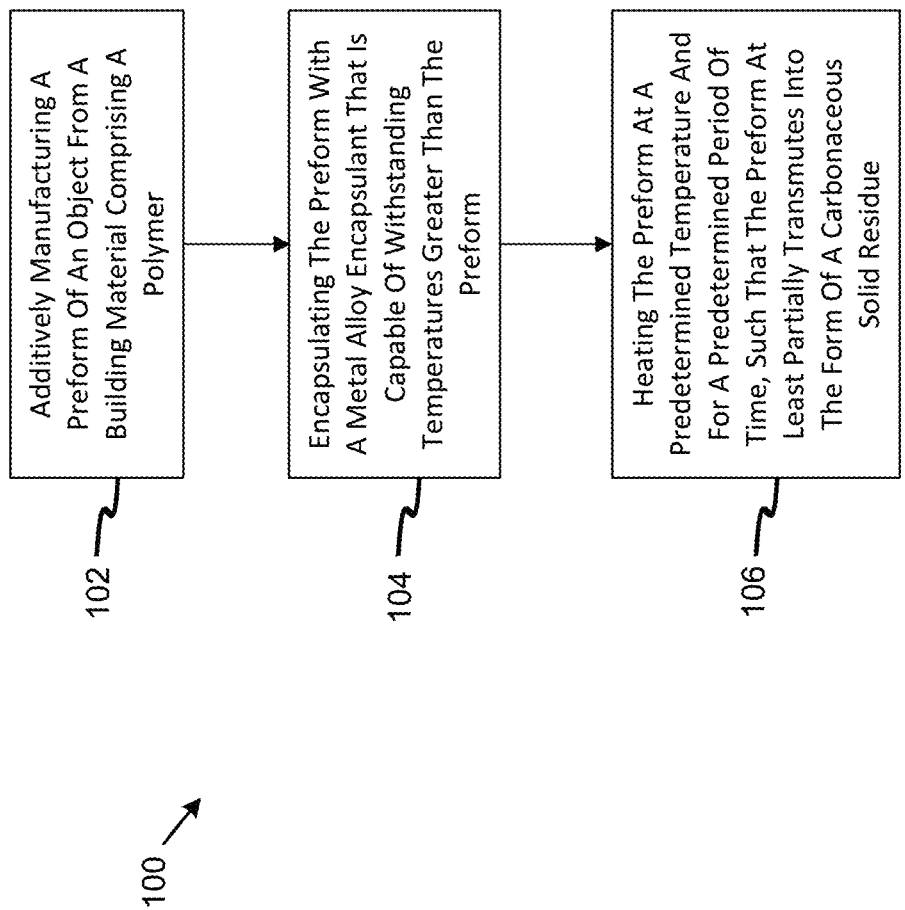
FIG. 2 illustrates a method in accordance with one embodiment of the present invention.

In reference to FIG. 2, a method 100 of producing a three-dimensional object in accordance with the present invention is shown. The method includes the following steps. First, the method includes the step 102 of additively manufacturing a preform of an object from a building material comprising a polymer. Second, the method includes the steps 104 of encapsulating the preform with a metal or metal alloy encapsulant that is capable of withstanding temperatures greater than the preform. The method further includes the step 106 of heating the preform at a predetermined temperature and for a predetermined period of time, such that the preform at least partially transmutes into the form of a carbonaceous solid residue.

Different additive manufacturing techniques may be used to prepare a three-dimensional preform from a building material comprising a polymer. In one embodiment of the present invention, selective laser sintering is employed ("LS"). LS is a layer-wise additive manufacturing technique in which electromagnetic radiation, for example from a $CO_2$ laser, is used to bind a powder building material at select points to create a solid structure having a desired three-dimensional shape. In alternative embodiments, particle radiation is employed. In some related techniques, for example techniques for use with metals, a technique referred to as selective laser melting ("LM") is used in which the powder is melted as opposed to sintered. While there are similarities between the processes, there are also distinct differences, both in the processes and powders used therein.

Figure 3:
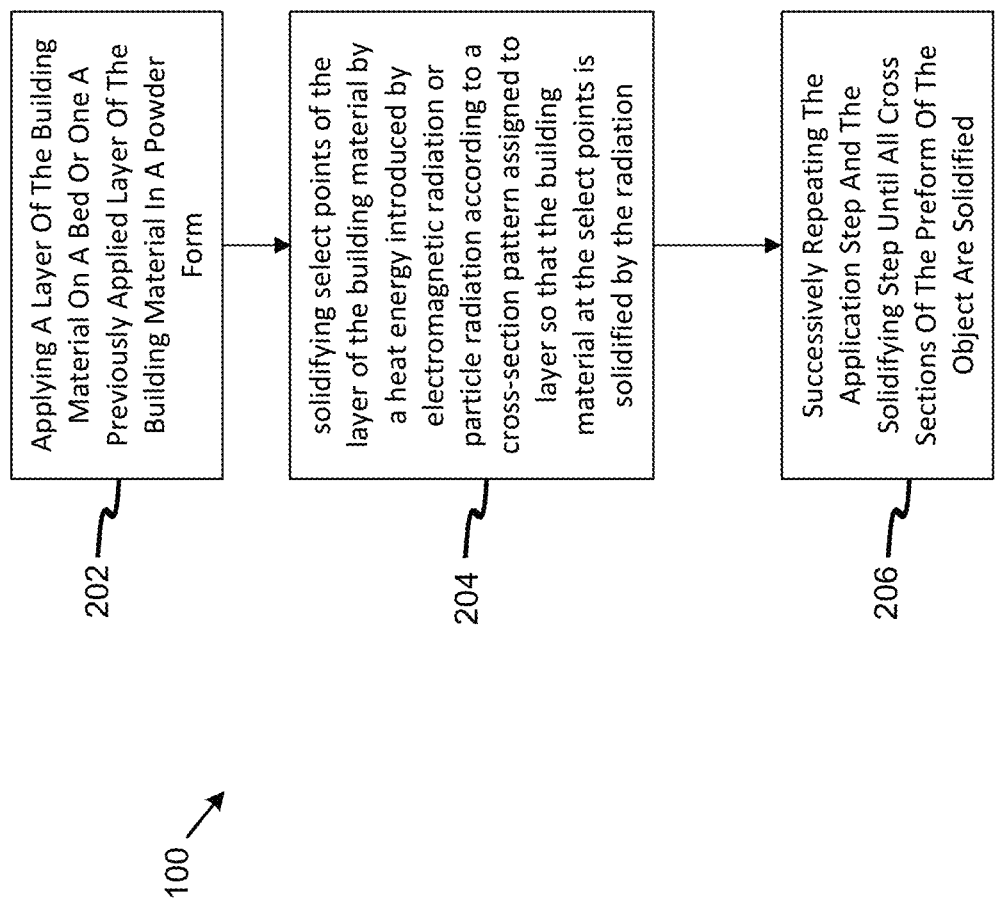
FIG. 3 illustrates a method of manufacturing a preform in accordance with one embodiment of the present invention.

Typically, a CAD model of the preform to be constructed by LS is prepared using known software applications. The CAD model is sectioned into layers to create build data for the object. The build data comprises a plurality of cross-section patterns according to the CAD model. In reference to FIG. 3, one embodiment of an LS build process 200 is shown. The method includes the step of 202 applying a layer of the building material on a bed or on a previously applied layer of the building material in a powder form. The method further includes the step 204 of solidifying select points of the layer of the building material by a heat energy introduced by electromagnetic radiation or particle radiation according to a cross-section pattern assigned to layer so that the building material at the select points is solidified by the radiation. The method further includes the step of successively repeating the application step and solidification step until all cross sections of the preform of the object are solidified.

Prior to scanning, an LS machine may preheat the powder material deposed on the bed to a temperature proximate to a melting point of the powder. Preheating is typically accomplished by one or more radiant heaters. Preheating the powder makes it easier for the laser to raise the temperature of powder to a fusing point.

After the layer-wise process is completed, the formed object(s) is deposed in a volume of unfused powder, referred to as a cake. The formed object(s) is extracted from the cake and unfused powder is removed from any voids in the object. Compressed air may be used to aid in this step. The powder from the cake that is not fused into the built part can be recovered, sieved, and used in a subsequent LS build.

It will be understood by a person of ordinary skill in the art and familiar with this disclosure that other manufacture techniques may be employed to obtain a preform from a polymer building material in accordance with some embodiments of the present invention.

The building material used in the LS process comprises a polymer. In this manner, it is possible to employ additive manufacture techniques that result in a structurally strong and lightweight three-dimensional object. One such class of polymer powders is polyaryletherketones ("PAEK") polymers. PAEKs are of interest in the LS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

-A-C(=O)—B—C(=O)—  I

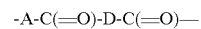
-A-C(=O)-D-C(=O)—  II where A is a p,p'-Ph-O-Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in, for example, Cheng, Z. D. et al, "Polymorphism and crystal structure identification in poly(aryl ether ketone ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercoolings, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Conn., including OXPEKK®-C, OXPEKK®-CE, OXPEKK®-D and OXPEKK®-SP, OXPEKK®-N, OXPEKK®-ESD polymers. Polyetherketoneketone polymers are also manufactured and supplied by Arkema. In addition to using polymers with a specific T:I ratio, mixtures of polyetherketoneketones may be employed.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated to not significantly reduce the melting temperature or the quantity of the crystallinity formed in the heat treatment process.

In some embodiments of the present invention carbon fiber is included in the build material. The carbon fiber enhances the transmutation of the preform manufactured from during the LS process from a polymer matrix to a form having a carbonaceous solid residue. The building material may comprise, for example, 85% by weight PEKK powder and 15% weight carbon fiber. Such a blend is available from Oxford Performance Materials, Inc. in S. Windsor, Conn. In some embodiments of the present invention, the amount of carbon fiber in the building material is at least 15% by weight. A person of ordinary skill and familiar with this disclosure will understand that the amount of carbon fiber added to the polymer blend may be varied.

Although the present disclosure is provided in reference to PAEK polymers, and more specifically PEKK polymers, the present disclosure is not so limited. A person of ordinary skill in the art and familiar with this disclosure would understand that the present invention may be employed with other types of polymers useful in LS and with other materials useful in LS, including, but not limited to, metals and ceramics.

In reference to FIG. 1, an LS system 10 in accordance with the present invention is illustrated. The system 10 includes a first chamber 20 having an actuatable piston 24 deposed therein. A bed 22 is deposed at an end of the piston 24. It should be understood that the term bed may refer to the physical structure supported on the piston or the uppermost layer of powder deposed thereon. In FIG. 1, the bed is shown as being heated. It should be understood to a person having skill in the art that a number of heaters may be employed in accordance with the present invention, including radiant heaters above the build platform or conductive heaters in and around the build platform.

The temperature of the bed 22 can be variably controlled via a controller 60 in communication with heating elements (not shown) in and or around the bed 22. Furthermore, the LS system 10 according to the invention may include a heating device above the bed 22, which preheats a newly applied powder layer up to a working temperature below a temperature at which the solidification of the powder material occurs. The heating device may be a radiative heating device (e.g., one or more radiant heaters) which can introduce heat energy into the newly applied powder layer in a large area by emitting electromagnetic radiation.

A second chamber 30 is adjacent to the first chamber 20. The second chamber 30 includes a table surface 32 deposed on an end of a piston 34 deposed therein. A powder 36 for use in the LS system 10 is stored in the second chamber 30 prior to the sintering step. It will be understood to a person of ordinary skill in the art and familiar with this disclosure that while a specific embodiment of an LS system is disclosed, the present invention is not limited and different known LS systems may be employed in the practice of the present invention.

During operation of the LS system 10, a spreader 40 translates across a top surface of the first chamber 20, evenly distributing a layer of powder 36 across either the top surface of the bed 22, or the material previously deposed on the bed 22. The LS system 10 preheats the powder material 36 deposed on the bed 22 to a temperature proximate to a melting point of the powder. Typically, a layer of powder is spread to have a thickness of 12 μm, however the thickness of the layer of powder can be increased or decreased depending on the specific LS process and within the limits of the LS system.

A laser 50 and a scanning device 54 are deposed above the bed 22. The laser 50 transmits a beam 52 to the scanner 54, which then distributes a laser beam 56 across the layer of powder 36 deposed on the bed 22 in accordance with a build data. The laser selectively fuses powdered material by scanning cross-sections generated from a three-dimensional digital description of the part on the surface of the bed having a layer of the powdered material deposed thereon. The laser 50 and the scanner 54 are in communication with the controller 60. After a cross-section is scanned, the bed 22 is lowered by one layer thickness (illustrated by the downward arrow), a new layer of powdered material is deposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

After the preform is manufactured, it is encapsulated in a metal or metal alloy that can withstand operational temperatures that are higher than the temperatures that the polymer of the preform can withstand. In reference to FIG. 2, the preform is encapsulated by nickel plating. Electroless nickel plating is an auto-catalytic chemical technique used to deposit a layer of nickel-phosphorus or nickel-boron alloy on a solid workpiece, such as the preform prepared according to the LS technique. The process relies on the presence of a reducing agent, for example hydrated sodium hypophosphite ($NaPO_2H_2.H_2O$) which reacts with the metal ions to deposit metal. The alloys with different percentage of phosphorus, ranging from 2-5 (low phosphorus) to up to 11-14 (high phosphorus) are possible. The metallurgical properties of alloys depend on the percentage of phosphorus. Unlike electroplating, it is not necessary to pass an electric current through the solution to form a deposit. Thus, this plating technique is preferred with polymer based performs. This plating technique is to prevent corrosion and wear. Electroless nickel plating can also be used to manufacture composite coatings by suspending powder in the bath. In some embodiments of the present of the present invention, electrolytic nickel plating is used. In such cases, several layers of copper may first be applied prior to electrolytic plating of the copper.

Typically, the thickness of the encapsulant is about between 1 and 20 thousandths of an inch, but it may vary depending on a number of factors, including the type of preform, the configuration of the preform, the type of coating, and the specific operating environment the part is being designed for. In some embodiments of the present invention, the thickness is between 0.006 inches and 0.012 inches in thickness. It will be understood to a person of ordinary skill in the art and familiar with this disclosure that other types plating techniques and material may be used to encapsulate the preform. These may include, but are not limited to, electroless cobalt plating, electroless tungsten plating, electroless copper plating, and electroless titanium plating. It should be further understood that electrolytic plating techniques may also by employed, particularly when the build material of the preform provides sufficient conductivity. In general, the encapsulant material should be selected to so that it can withstand an operating temperature that is greater than the operating temperature that the preform alone can withstand. In this manner, it is possible to achieve an object that includes at least some of the preferred attributes associated with LS, but that can withstand higher operating temperatures.

Regarding the encapsulating step, the step can be performed before or after the heating step. In some embodiments, the encapsulation involves tightly-bonded electroless nickel encapsulation. It is preferred that the encapsulating step is preferred prior to the heating step, as the encapsulant aids in the transmutation process described below. Wet plating ensures a uniform layer of the encapsulant is deposited on the preform. Other methods are possible, especially in the case of a part having a simple geometry.

Figure 4:
FIG. 4 illustrates an object in accordance with the present invention.

In reference to FIG. 4, an object 300 manufactured in accordance with the present invention is shown. The object is a portion of several blades used in secondary stage of a turbine engine. It will be evident to a person having ordinary skill in the art that the LS process enables manufacture of the unique shape of the object 300 at a reduced cost compared with currently known methods.

Figure 5:
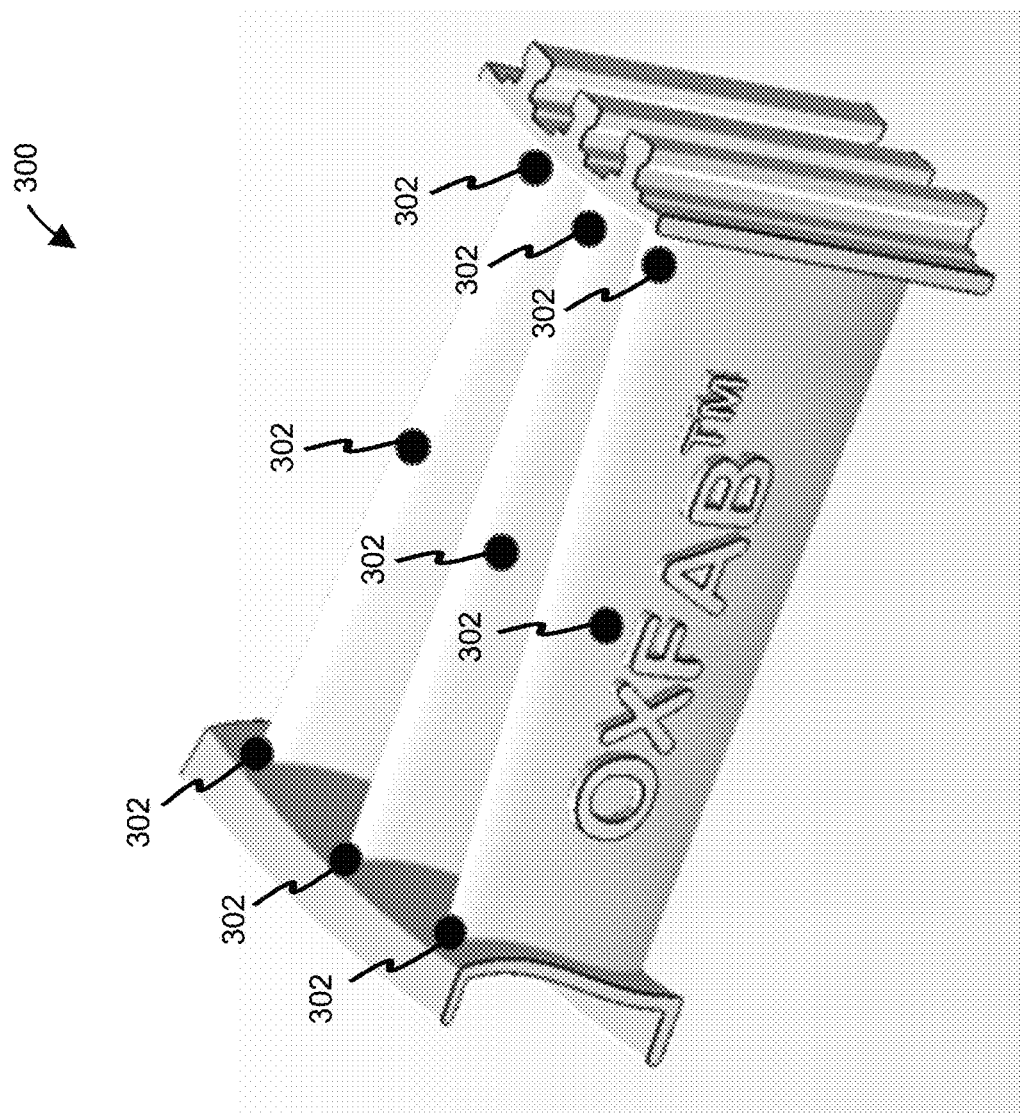
FIG. 5 illustrates the location of several vent holes in the encapsulant in accordance with one embodiment of the present invention.

Regarding the step of providing venting holes, the venting holes can be strategically placed such that the structure of the metal alloy encapsulant is not overly compromised, but such that adequate venting is provided to allow off-gassing products to escape during the heating step. In reference to FIG. 5, the object 300 has a plurality of vent holes 302 formed therein. It will be understood by a person of ordinary skill in the art and familiar with this invention that the size and shape of the holes can vary. The holes may be formed by a drilling process. In other embodiments, unique features may be incorporated into the preform that allow for the holes to be snapped into place.

Regarding the step of heating the preform, the predetermined temperature and duration of the heating can be selected to prevent gas expansion that may cause the preform and/or the metal alloy encapsulation to deform and/or rupture. The objective of the heating step is not to remove the preform from the metal alloy encapsulation. Instead, the objective is to maintain the position of the preform relative to the metal alloy encapsulation, while at least partially transmuting the preform into the form of a carbonaceous solid residue. The transmuted preform (and thus the resulting object that includes the transmuted preform and the metal alloy encapsulation) is capable of withstanding high temperatures caused, for example, by friction heating. During the heat process, the polymer will chain extend to the extent it can and become melt immobile and it will also start shedding of the hydrogen and oxygen in the polymer and become carbon.

After the preform is transmuted, it results in structures with mixed graphite fiber and random graphite and amorphous carbon in the mix. The transmuted perform is surround the encapsulant. It has been discovered that the transmuted mass in the interior of the cavity improves the structural properties of a hollow encapsulant, with typically are subject to crumpling and folding. The transmuted has the additional benefit that it can operate within the specified temperature ranges without melting.

In some embodiments of the present invention, the heating step occurs in a conventional oven. An inert heating environment has been shown in increase the transmutation effect. In on embodiment, the heating takes place in a nitrogen environment. It is preferred that a temperature ramp is used to steadily and increase the temperature to the desired transmutation temperature. Afterward, the part is held at the set temperature point. After the transmutation has fully occurred, the temperature is ramped down. Using a building material with a PEKK and carbon fiber blend in accordance with the present invention, the encapsulated preform is heated at a temperature set point between 400 C and 500 C and held at temperature for at least several hours.

Regarding the step of closing the venting holes, this step can involve selectively welding, brazing, plating, and/or gluing the venting holes closed. This step can be performed within an inert gas environment in order to protect the carbonized structure.

The object manufactured according to the above-described method includes: (i) a preform additively manufactured from the above-described powder mixture, the preform having been heated at a predetermined temperature and for a predetermined period of time such that the preform at least partially transmuted into the form of a carbonaceous solid residue; and (ii) a metal alloy encapsulant at least partially encapsulating the preform, the metal alloy encapsulant being made of a material that is capable of withstanding high temperatures.

The present disclosure describes aspects of the present invention with reference to the above-described embodiments; however, aspects of the present invention are not limited to those embodiments. It will be apparent to those of ordinary skill in the art that aspects of the present invention include many more embodiments. Accordingly, aspects of the present invention are not to be restricted in light of the above-described embodiments. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A method of producing a three-dimensional object, comprising the steps of:
    additively manufacturing a preform of a three-dimensional object from a building material selected from the group consisting of a polymer, polyaryletherketone ("PAEK"), carbon fiber, at least 15% carbon fiber by weight, or polyetherketone ketone ("PEKK");
    encapsulating the preform with a metal or metal alloy that is capable of withstanding temperatures greater than the preform;
    providing venting holes in the encapsulated preform prior to a step of heating so that solvents may be vented from the encapsulated preform during the step of heating;
    heating the encapsulated preform at a predetermined temperature and for a period of time, such that the preform substantially transmutes into a form of a carbonaceous solid residue;
    maintaining the preform within an inert gas environment during the heating step;
    wherein the step of additively manufacturing the preform of the three-dimensional object from the building material comprises the following steps:
        applying a layer of the building material on a bed or on a previously applied layer of the building material in a powder form;
        solidifying select points of the layer of the building material by a heat energy introduced by electromagnetic radiation or particle radiation according to a cross-section pattern assigned to layer so that the building material at the select points is solidified by the radiation;
        wherein the applying step and the solidifying step are successively repeated until all cross sections of the preform of the object are solidified;
    wherein the step of encapsulating the preform comprises the step of applying a nickel plating that is capable of withstanding high temperatures;
    wherein the step of heating comprises:
        increasing the temperature in the inert gas environment at a controlled rate that minimizes expansion of the preform;
        maintaining a temperature in the inert gas environment, after the step of increasing the temperature, between 400 Celsius and 500 Celsius.

2. The method of claim 1, further comprising a step of closing the venting holes in the metal alloy encapsulant after the step of heating.

3. The method of claim 2, wherein the step of closing the venting holes is performed in the inert environment.

4. A method of producing a three-dimensional object, comprising the steps of:
    additively manufacturing a preform of a three-dimensional object from a building material selected from the group consisting of a polymer, polyaryletherketone ("PAEK"), or carbon fiber;
    encapsulating the preform with a metal or metal alloy that is capable of withstanding temperatures greater than the preform;
    providing venting holes in the encapsulated preform so that solvents may be vented from the encapsulated preform during a subsequent heating;
    heating the encapsulated preform at a predetermined temperature and for a period of time, such that the preform substantially transmutes into a form of a carbonaceous solid residue;
    maintaining the preform within an inert gas environment during the heating step;
    wherein the step of additively manufacturing the preform of the three-dimensional object from the building material comprises the following steps:
        applying a layer of the building material on a bed or on a previously applied layer of the building material in a powder form;
        solidifying select points of the layer of the building material by a heat energy introduced by electromagnetic radiation or particle radiation according to a cross-section pattern assigned to layer so that the building material at the select points is solidified by the radiation;
        wherein the applying step and the solidifying step are successively repeated until all cross sections of the preform of the object are solidified;
    wherein the step of encapsulating the preform comprises the step of applying a nickel plating that is capable of withstanding high temperatures;
    wherein the step of heating comprises:
        increasing the temperature in the inert gas environment at a controlled rate that minimizes expansion of the preform;
        maintaining a temperature in the inert gas environment, after the step of increasing the temperature, at 400 Celsius or greater.

5. The method of claim 4, wherein the temperature is maintained for a period of time such that the preform substantially transmutes into the form of a carbonaceous solid residue.

6. The method of claim 4, further comprising a step of closing the venting holes in the metal alloy encapsulant after the step of heating.

7. The method of claim 4, wherein the step of closing the venting holes is performed in the inert environment.

8. The method of claim 4, wherein the building material is at least 15% carbon fiber by weight.

9. The method of claim 4, wherein the building material comprises polyetherketone ketone ("PEKK").

10. The method of claim 4, wherein the step of heating comprises:
    maintaining a temperature in the inert gas environment, after the step of increasing the temperature, between 400 Celsius and 500 Celsius.

* * * * *